United States Patent
Takahashi et al.

(10) Patent No.: US 8,712,465 B2
(45) Date of Patent: Apr. 29, 2014

(54) MOBILE TERMINAL DEVICE CAPABLE OF MORE EFFECTIVELY UTILIZING OPERATION PORTIONS, CONDUCTIVE PORTION, OPERATION DETECTING UNIT, POWER SUPPLY UNIT, AND SIGNAL PROCESSING UNIT

(75) Inventors: Shin Takahashi, Kanagawa (JP);
Tadashi Koyama, Kanagawa (JP);
Mitsuhiro Nishizono, Kanagawa (JP);
Takumi Ogata, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 359 days.

(21) Appl. No.: 13/034,024

(22) Filed: Feb. 24, 2011

(65) Prior Publication Data

US 2011/0207508 A1 Aug. 25, 2011

(30) Foreign Application Priority Data

Feb. 24, 2010 (JP) .................................. 2010-039460

(51) Int. Cl.
*H04M 1/00* (2006.01)
(52) U.S. Cl.
USPC ...................................................... 455/550.1
(58) Field of Classification Search
USPC ....................................................... 455/550.1
See application file for complete search history.

(56) References Cited

U.S. PATENT DOCUMENTS

| | | | |
|---|---|---|---|
| 2004/0219956 A1* | 11/2004 | Iwai et al. | 455/575.3 |
| 2007/0024509 A1* | 2/2007 | Lee | 343/702 |
| 2008/0272749 A1* | 11/2008 | Tanaka et al. | 323/233 |
| 2009/0098827 A1* | 4/2009 | Koyama | 455/41.2 |
| 2009/0305727 A1* | 12/2009 | Pylkko | 455/456.3 |
| 2010/0277348 A1* | 11/2010 | Birch et al. | 341/22 |

FOREIGN PATENT DOCUMENTS

| | | |
|---|---|---|
| JP | 2008-72204 A | 3/2008 |
| KR | 10-2004-0071656 | 8/2004 |

OTHER PUBLICATIONS

Machine Translation, JP 2008-072204 Matsushita Electronic Ind. Co. Ltd. Mar. 27, 2008.*
Notice of Reasons for Rejection issued to Korean Application No. 10-2011-0015615, mailed Apr. 27, 2012. (English translation included).

* cited by examiner

*Primary Examiner* — Temesgh Ghebretinsae
*Assistant Examiner* — Devan Sandiford
(74) *Attorney, Agent, or Firm* — Hoffmann & Baron, LLP

(57) ABSTRACT

An object of the present invention is to provide a mobile terminal device capable of utilizing a conductive portion further more effectively. A cellular telephone device includes: a key switch, of which electrical state changes depending on an operation on an operation unit; a CPU that is connected to the key switch, and detects an operation on the operation unit based on change in the electrical state of the key switch; a power supply unit that is electrically connected to the key switch; and an RF circuit unit that is connected to the power supply unit, and processes a signal resonated by the key switch.

10 Claims, 6 Drawing Sheets

MOBILE TERMINAL DEVICE CAPABLE OF MORE EFFECTIVELY UTILIZING OPERATION PORTIONS, CONDUCTIVE PORTION, OPERATION DETECTING UNIT, POWER SUPPLY UNIT, AND SIGNAL PROCESSING UNIT

This application is based on and claims the benefit of priority from Japanese Patent Application No. 2010-039460 filed on 24 Feb. 2010, the content of which is incorporated herein by reference.

BACKGROUND OF THE INVENTION

1. Field of the Invention

The present invention relates to a mobile terminal device having operation portions.

2. Related Art

There has been conventionally known a mobile terminal device including: a body; operation portions provided to the body; a conductive portion provided to the body, in which an electrical state of the conductive portion changes in accordance with an operation on the operation portions; and an operation detecting unit connected to the conductive portion, in which the operation detecting unit detects an operation on the operation portions based on change in the electrical state of the conductive portion (for example, see Japanese Unexamined Patent Application, Publication No. 2008-72204).

SUMMARY OF THE INVENTION

Incidentally, in such a mobile terminal device, a conductive portion has been desired to be utilized further more effectively.

An object of the present invention is to provide a mobile terminal device capable of utilizing a conductive portion further more effectively.

In order to solve the aforementioned problem, a mobile terminal device according to the present invention includes: a body; operation portions provided to the body; a conductive portion provided to the body, an electrical state of the conductive portion changing in response to an operation on the operation portions; an operation detecting unit that is connected to the conductive portion, and detects an operation on the operation portions based on change in the electrical state of the conductive portion; a power supply unit connected to the conductive portion; and a signal processing unit that is connected to the power supply unit, and processes a signal resonated by the conductive portion.

Moreover, the mobile terminal device may further include a high-frequency cutoff unit that is connected to the conductive portion, and cuts off a high frequency signal, in which a path-length from an end portion in the conductive portion connected to the high-frequency cutoff unit to an end portion connected to the power supply unit may be a length of n/4 times a wavelength of a signal processed by the signal processing unit.

In addition, the operation detecting unit may detect an operation on the operation portions by detecting an actuating signal arising from change in the electrical state of the conductive portion, and the high-frequency cutoff unit may be configured to allow the actuating signal to pass therethrough.

Furthermore, the mobile terminal device may further include a filter that is connected to the conductive portion, and cuts off a signal in a specific frequency band, in which the signal processing unit may be configured to be able to process a signal in the specific frequency band resonated by a first conductive region formed between the power supply unit and the filter, and a signal resonated by a second conductive region that is a region different from the first conductive region in the conductive portion.

Moreover, the mobile terminal device may further include a capacitor connected to a path of a signal processed by the signal processing unit.

In addition, the mobile terminal device may further include an antenna element connected to the conductive portion, in which the power supply unit may be connected to the conductive portion via the antenna element, and the signal processing unit may process a signal resonated by the antenna element and the conductive portion.

Furthermore, the conductive portion and the antenna element may be capacitively connected with each other.

Moreover, the mobile terminal device may further include a circuit board, in which an insulating layer may be formed on a surface layer of the circuit board, and the conductive portion may be formed as a conductive pattern on a layer that is more inner than the insulating layer, and the conductive portion and the antenna element may be capacitively connected with each other, by capacitively coupling the conductive pattern and the antenna element with the insulating layer interposed therebetween.

In addition the antenna element may further include an elastic deformation portion being elastically deformable, and the elastic deformation portion may abut the insulating layer.

Furthermore, the conductive portion may be a key switch of the operation portions and/or a signal line that electrically connects the signal processing unit and the key switches.

Moreover, the mobile terminal device may further include a resistor connected to the signal line, and the high-frequency cutoff unit may be the resistor.

In addition, the high-frequency cutoff unit may be an inductor provided between the conductive portion and the operation detecting unit.

Furthermore, a plurality of the operation portions may be provided, a plurality of the conductive portions may be provided correspondingly to the plurality of operation portions, and each of the plurality of conductive portions may function as an antenna.

Moreover, the mobile terminal device may further include a switching unit that switches connection of each of the conductive portions and the power supply unit, and when one operation portion among the plurality of operation portions is operated, the switching unit may selectively connect the conductive portions other than a conductive portion corresponding to the one operation portion thus operated to the power supply unit.

In addition, the mobile terminal device may further include: a circuit board on which the plurality of conductive portions are disposed; and a storage unit that stores relative position information of the conductive portions in the circuit board, and when one operation portion among the plurality of operation portions is operated, the switching unit may selectively connect the conductive portions other than a conductive portion corresponding to the one operation portion thus operated to the power supply unit based on the position information.

Furthermore, the mobile terminal device may further include: a circuit board on which the plurality of conductive portions are disposed; and an inclination angle detecting unit that detects an inclination angle of the body, and when one operation portion among the plurality of operation portions is operated, the switching unit may selectively connect the conductive portions other than a conductive portion corresponding to the one operation portion thus operated to the power supply unit based on the inclination angle of the body.

Moreover, the mobile terminal device may further include: a circuit board on which the plurality of conductive portions are disposed; and a proximity state detecting unit that detects a proximity state of a physical object relative to each of the operation portions, and when one operation portion among the plurality of operation portions is operated, the switching unit may selectively connect the conductive portions other than a conductive portion corresponding to the one operation portion thus operated to the power supply unit based on the proximity state.

According to the present invention, it is possible to provide a mobile terminal device capable of utilizing a conductive portion further more effectively.

DETAILED DESCRIPTION OF THE INVENTION

Figure 1:
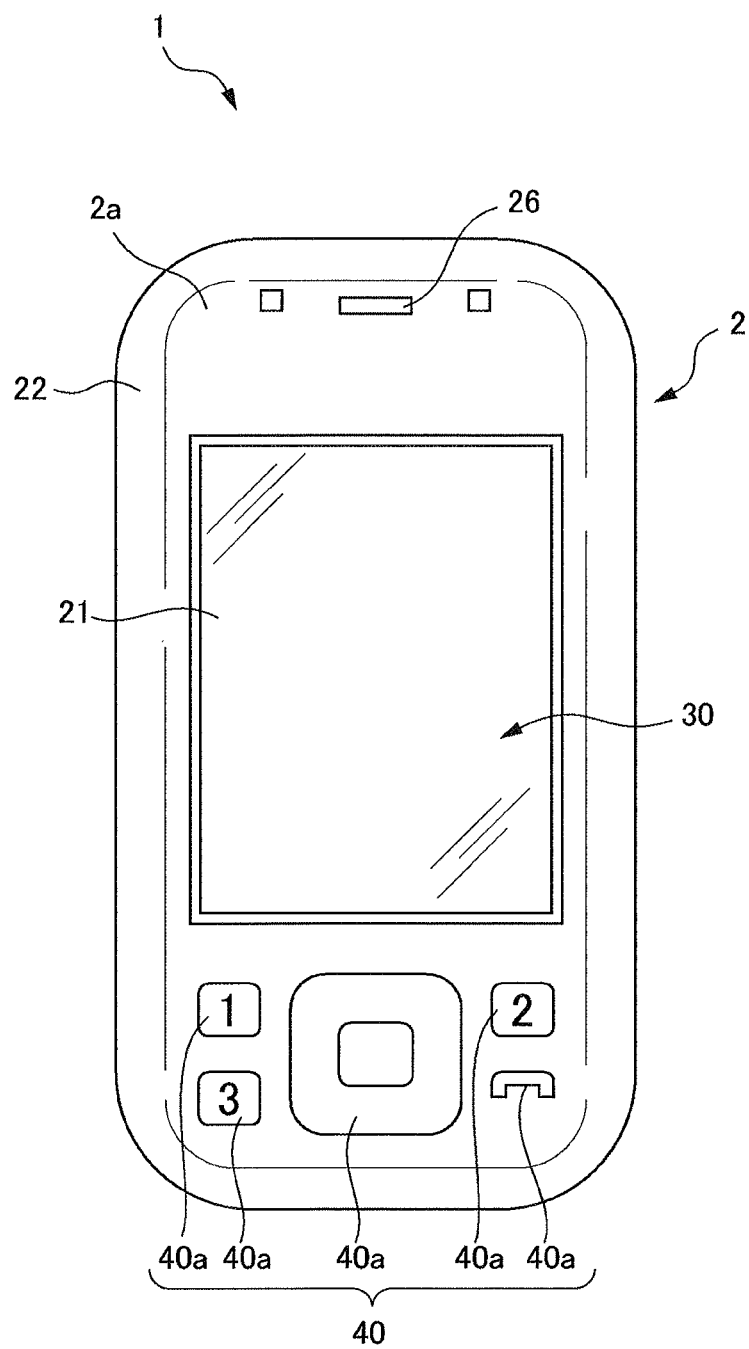
FIG. 1 is a front view of a cellular telephone device according to one embodiment of a mobile terminal device of the present invention.

A preferable embodiment of a mobile terminal device according to the present invention is hereinafter described with reference to the drawings. FIG. 1 is a front view of a cellular telephone device 1 according to one embodiment of the mobile terminal device of the present invention. As shown in FIG. 1, the cellular telephone device 1 of the present embodiment is a cellular telephone device 1 of a straight type, and an external shape thereof is configured mainly with a body 2.

As shown in FIG. 1, the body 2 has a substantially rectangular parallelopiped shape. The body 2 is configured mainly with a cover panel 21, a front case 22, a rear case (not shown), a rear panel (not shown) as an outer body, and a battery cover (not shown).

A front face 2a of the body 2 is configured mainly with the cover panel 21 and the front case 22. A display unit 30 and an operation unit 40 are provided to the front face 2a of the body 2.

Figure 2:
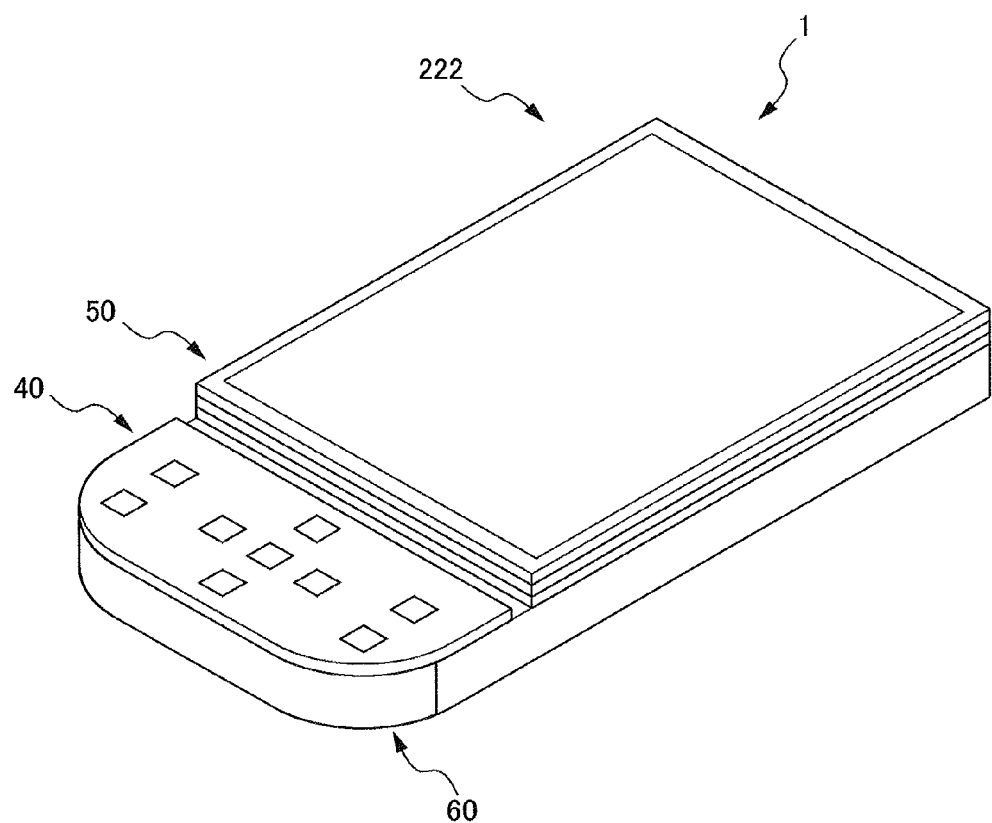
FIG. 2 is a partially exploded perspective view in a vicinity of operation portions of the cellular telephone device.

FIG. 2 is a partially exploded perspective view in a vicinity of the operation unit 40 of the cellular telephone device 1. The display unit 30 is configured by disposing a liquid crystal module 222 that displays a variety of information through an opening (not shown) provided to the front case 22.

The operation unit 40 is configured by exposing a plurality of operation key members 40a on an external surface of the front case 22. A predetermined function is assigned to each of the plurality of operation key members 40a (key assignment). In the cellular telephone device 1, by a user depressing the plurality of operation key members 40a, an operation according to a function assigned to each of the operation key members 40a is performed. The operation unit 40 is formed on a lower end portion side that is one end portion in a longitudinal direction of the body 2. The cover panel 21 is configured with a transparent member. The cover panel 21 is disposed on an outer face side of the front case 22 so as to cover the opening in which the liquid crystal module 222 is disposed.

Moreover, a sound output unit 26 is formed on the front face 2a of the body 2, and the sound output unit 26 outputs sound of the other party of the conversation when using the cellular telephone device 1. The sound output unit 26 is formed on an upper end portion side that is another end portion in the longitudinal direction of the body 2.

A main substrate 50 is disposed on a rear case side of the liquid crystal module 222, and a variety of electronic components are mounted on the main substrate 50. In other words, the liquid crystal module 222 is disposed on a front case 22 side of the main substrate 50.

The operation unit 40 is configured to include the operation key members 40a (operation portions) and a key substrate 40b (circuit board). As described above, the operation key members 40a are configured with a plurality of operation key members. The key substrate 40b has a plurality of key switches 40c. The plurality of key switches 40c are disposed in positions facing the operation key members 40a, respectively. Each of the plurality of key switches 40c disposed on the key substrate 40b has a structure of, for example, a metal dome that is three-dimensionally formed by curving a metal plate into a bowl shape. The metal dome is configured such that, when an apex of the bowl shape is depressed, a switch electrode 40d (see FIG. 4) formed in an electrical circuit that is formed (printed) on a surface of the key substrate 40b is contacted, thereby establishing electrical conduction.

A support member 60 and an antenna element 70 formed on the support member 60 are disposed on the rear case side of the operation unit 40.

Figure 3:
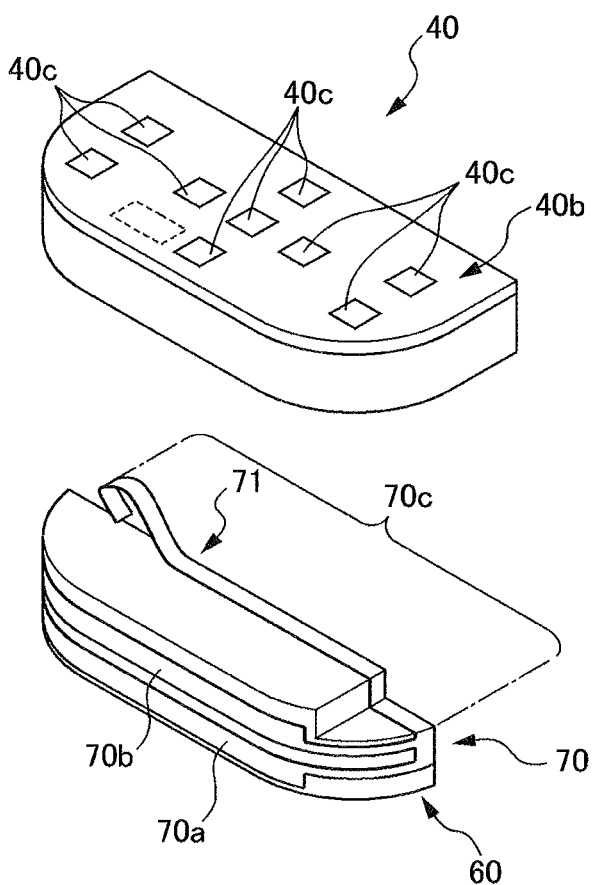
FIG. 3 is an exploded perspective view showing a configuration of the operation portions, a support member and an antenna element.

FIG. 3 is an exploded perspective view showing a configuration of the operation unit 40, the support member 60 and the antenna element 70. As shown in FIG. 3, a plurality of signal lines (for example, signal lines L1, L2 and L3 shown in FIG. 4 and described later) are connected to each of the plurality of key switches 40c.

The antenna element 70 is configured with a plate-like sheet metal, and is formed on a side face and a top face of the support member 60. It should be noted that, although the antenna element 70 is configured with a plate-like sheet metal in the present embodiment, the antenna element 70 may be configured with another conductive member.

Moreover, the antenna element 70 has an element 70a, an element 70b and an element 70c. The elements 70a and 70b are formed along the side face of the support member 60.

The element 70c is formed on the top surface of the support member 60. One end of the element 70c is coupled with an end portion of the element 70a and an end portion of the element 70b. As a result, the element 70a, the element 70b and the element 70c form the integrated antenna element 70.

In addition, a tip 71 of another end of the element 70c has an elastically deformable leaf spring shape. The tip 71 in an elastically deformed state abuts a surface of the key substrate 40b (a portion indicated with a broken line in FIG. 3).

Figure 4:
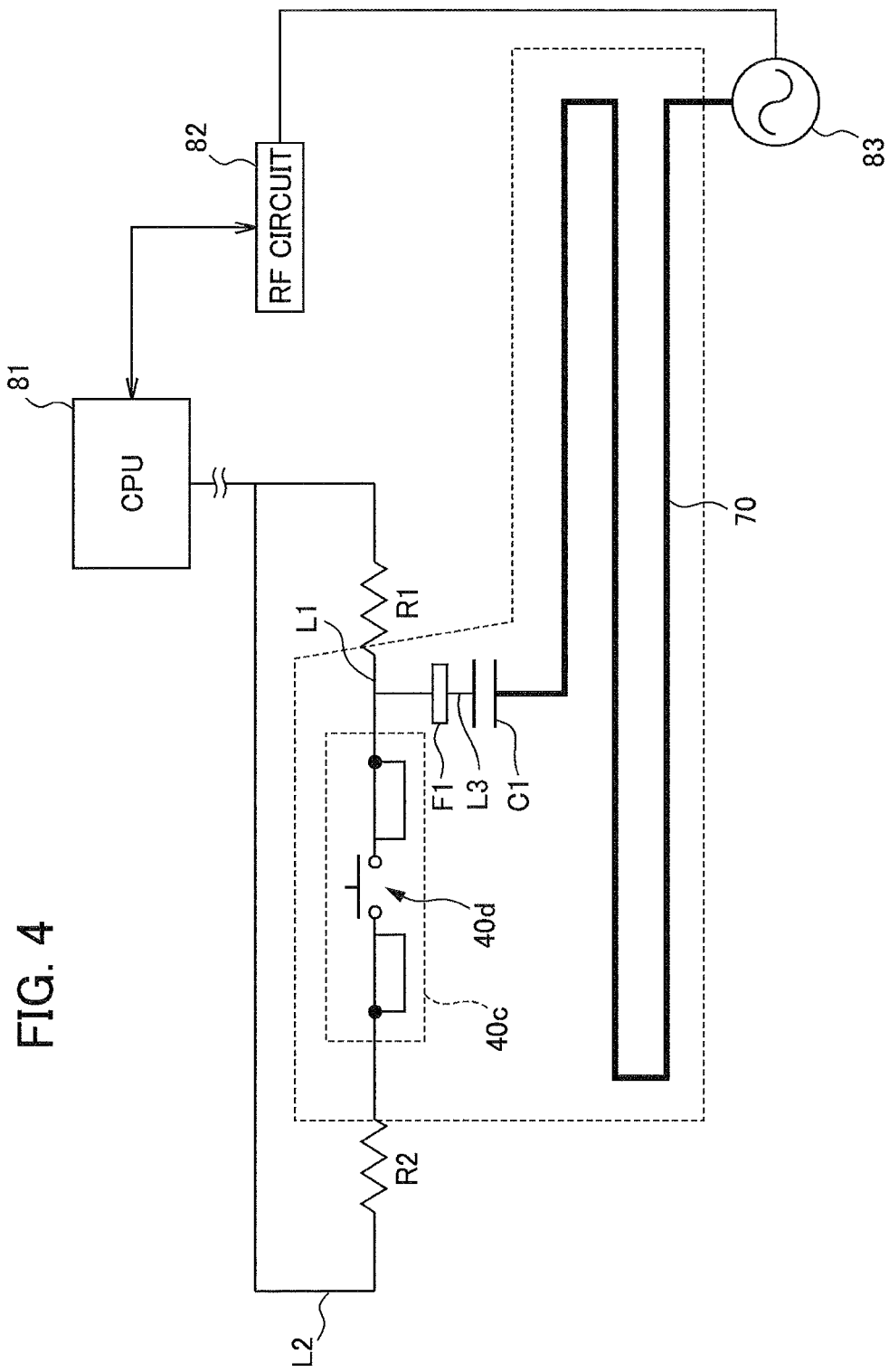
FIG. 4 is a diagram showing an electrical configuration regarding a key switch and the antenna element.

FIG. 4 is a diagram showing an electrical configuration regarding the key switch 40c and the antenna element 70.

As shown in FIG. 4, the cellular telephone device 1 includes: the key switch 40c as a conductive portion; the antenna element 70; a CPU 81 as an operation detecting unit; an RF circuit unit 82 as a signal processing unit; a power supply unit 83; the signal lines L1 L2 and L3 as conductive portions; resistors R1 and R2 as high-frequency cutoff portions; a capacitor C1; and a filter F1. It should be noted that, although the key switch 40c is shown as a single key switch 40c in FIG. 4, a plurality of other key switches 40c are also provided with a similar configuration.

The CPU 81 is mounted on the main substrate 50, and controls operations of the entire cellular telephone device 1. The CPU 81 is connected to the switch electrode 40d of the key switch 40c via the signal lines L1 and L2.

The CPU 81 detects an operation on the operation unit 40, based on change in the electrical state of the key switch 40c and the signal lines L1, L2 and L3.

More specifically, in the switch electrode 40d, potential is different between a state where the operation key member 40a is depressed and a state where the operation key member 40a is not depressed; therefore, the CPU 81 detects an operation on the operation key member 40a based on this potential difference. In other words, the CPU 81 detects an operation on the operation key member 40a by detecting an actuating signal arising from change in the electrical state of the key switch 40c and the signal lines L1, L2 and L3.

The RF circuit unit 82 (signal processing unit) is connected to the CPU 81 and the power supply unit 83. The RF circuit unit 82 processes a high frequency signal resonated by the key switch 40c as a conductive portion, the switch electrode 40d, the signal lines L1 and L2, and the antenna element 70. The power supply unit 83 is connected to an end portion of the antenna element 70 and to the RF circuit unit 82.

One end of the antenna element 70 is connected to the signal line L1 via the capacitor C1 and the signal line L3. Moreover, another end of the antenna element 70 is connected to the power supply unit 83.

One end each of the signal lines L1 and L2 is connected to the key switch 40c, and another end each thereof is connected to the CPU 81. Moreover, one end of the signal line L3 is connected to the signal line L1, and another end thereof is connected to the capacitor C1. The signal lines L1, L2 and L3 are configured with a conductive member, and transmit an actuating signal described later and a signal resonated by the conductive members such as the operation key member 40a, etc. The resistor R1 is connected to the signal line L1. The resistor R2 is connected to the signal line L2. The resistors R1 and R2 cut off a high frequency signal resonated by the key switch 40c, the antenna element 70, and the signal lines L1, L2 and L3. It should be noted that, although the resistors R1 and R2 are used as high-frequency cutoff portions in the present embodiment, it is not limited thereto, and for example, inductors or beads may be used as high-frequency cutoff portions.

Here, a path-length from an end portion in the signal line L1 connected to the resistor R1 and an end portion in the signal line L2 connected to the resistor R2 to an end portion connected to the power supply unit 83 is a length of n/4 times a wavelength of a signal processed by the RF circuit unit 82. It should be noted that n is an integer of at least 1 (n=1, 2, 3, . . .).

In other words, the resistors R1 and R2 that cut off a high frequency signal are connected to the signal lines L1 and L2 in positions where the path-length of a signal to the power supply unit 83 is a length of n/4 times a wavelength of a signal processed by the RF circuit unit 82.

As described above, the switch electrode 40d configures the metal dome in the key switch 40c. The switch electrode 40d is provided so as to face the operation key member 40a. The signal lines L1 and L2 extend from the switch electrode 40d to the CPU 81. In addition, a surface area of the switch electrode 40d is greater than a surface area of the signal lines L1 and L2.

Furthermore, the resistors R1 and R2 are configured to allow an actuating signal to pass therethrough, and the actuating signal arises from change in the electrical state of the key switch 40c, the switch electrode 40d, and the signal lines L1 and L2.

The filter F1 is connected to the signal line L3, and is configured with an element that cuts off signals in a specific frequency band. Moreover, the RF circuit unit 82 is configured to be able to process a first signal in a specific frequency band resonated by a first conductive region A1 formed between the power supply unit 83 and the filter F1, and a second signal resonated by a region different from the first conductive region A1 (for example, a second conductive region A2 between the power supply unit 83 and the end portion of the signal line L1).

More specifically, as the filter F1, a lowpass filter that cuts off frequency of at least 800 MHz is connected to the signal line L3. In this case, the key switch 40c, the switch electrode 40d, the signal lines L1 and L3, and the antenna element 70 (a portion indicated with a broken line in FIG. 4) operate as, for example, an antenna that resonates at 800 MHz as a usable frequency band. Furthermore, the antenna element 70 operates alone as an antenna that resonates at 2 GHz as a usable frequency band.

The capacitor C1 is connected to at least one position in the signal line L1, L2 or L3 that configures a path of a signal processed by the RF circuit unit 82.

Figure 5:
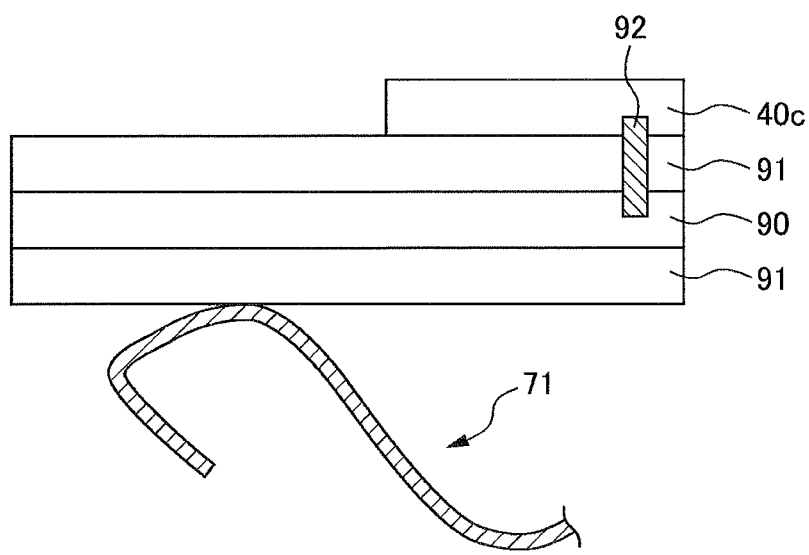
FIG. 5 is a diagram showing another configuration example for electrically connecting the key switch and the antenna element.

FIG. 5 is a diagram showing another configuration example for electrically connecting the antenna element 70 and the signal line L1, L2 or L3. As shown in FIG. 5, the key switch 40c and the antenna element 70 are capacitively connected with each other.

As shown in FIG. 5, on the key substrate 40b, a conductive pattern 90 is formed in a position facing the tip 71 of the antenna element 70. The conductive pattern 90 is configured with, for example, a copper foil, and configures the signal lines L1, L2 and L3.

Furthermore, insulating layers 91 are formed above and under the conductive pattern 90. In other words, in the key substrate 40b, the insulating layers 91 are formed on a front surface and a back surface thereof, and the conductive pattern 90 is formed between the insulating layers 91 thereon and thereunder. In addition, the key switch 40c is further formed on the insulating layer 91 formed on the front surface. The key switch 40c is connected to a conductor formed in a through hole 92 that extends from the conductive pattern 90 to the front surface.

Therefore, the signal line L1, L2 or L3, eventually the key switch 40c and the tip 71 of the antenna element 70 are capacitively connected with one another, by capacitively coupling the conductive pattern 90 and the antenna element 70 with the insulating layers 91 interposed therebetween. Moreover, as shown in FIG. 5, the tip 71 of the antenna element 70 in an elastically deformed state abuts the insulating layer 91. It should be noted that the tip 71 of the antenna element 70 may be directly capacitively coupled with the key switch 40c and the switch electrode 40d without involving the signal lines L1, L2 and L3.

As discussed above, according to the present embodiment, the cellular telephone device 1 has: the key switch 40c provided to the body 2, in which an electrical state of the key switch 40c changes depending on an operation on the operation unit 40; the CPU 81 that is connected to the key switch 40c via the signal lines L1, L2 and L3, and detects an operation on the operation unit 40 based on change in the electrical state of the key switch 40c and the signal lines L1, L2 and L3; the power supply unit 83 that is electrically connected to the key switch 40*c*; and the RF circuit unit 82 that is connected to the power supply unit 83, and processes a signal resonated by the key switch 40*c* and the signal lines L1, L2 and L3.

As a result, in the cellular telephone device 1, the key switch 40*c* as a conductive portion and the signal lines L1, L2 and L3 can be used as an antenna element; therefore, the key switch 40*c* as a conductive portion can be effectively utilized.

In addition, according to the present embodiment, the path-length from the end portion in the signal line L1 connected to the resistor R1 and the end portion in the signal line L2 connected to the resistor R2 to the end portion of the antenna element 70 connected to the power supply unit 83 is a length of n/4 times a wavelength of a signal processed by the RF circuit unit 82.

As a result, the cellular telephone device 1 can improve the efficiency of processing signals received by way of the key switch 40*c* as an antenna element.

Furthermore, according to the present embodiment, the switch electrode 40*d* is provided so as to face the operation key member 40*a*, and the signal lines L1 and L2 extend from the switch electrode 40*d* to the CPU 81.

Moreover, the switch electrode 40*d* is a member that configures the key switch 40*c*. Here, since the key switch 40*c* is close to a human body (a finger of a user), in a case in which the key switch 40*c* alone is used as a conductive portion, the antenna characteristics of the conductive portion may vary due to the influence from the human body.

Since the present embodiment is configured to perform resonance of signals by using the signal lines L1 and L2 that are more distant from a human body than the key switch 40*c* is, the influence due to a human body can be reduced.

Here, in terms of the antenna element 70, since the key switch 40*c* and the signal lines L1 and L2 are made of metal, the antenna characteristics of the antenna element 70 may vary due to the key switch 40*c* and the signal lines L1 and L2. In addition, even if only the signal lines L1 and L2 are connected to the antenna element 70, since the surface area of the switch electrode 40*d* of the key switch 40*c* is greater than the surface area of the signal lines L1 and L2, the antenna characteristics of the antenna element 70 may vary due to the influence of the switch electrode 40*d*.

In the present embodiment, the key switch 40*c* and the signal lines L1 and L2 are used as conductive portions, and the resistors R1 and R2 are connected to the signal lines L1 and L2, respectively. Therefore, the cellular telephone device 1 can suppress the deterioration of the antenna characteristics of the antenna element 70.

Furthermore, according to the present embodiment, the CPU 81 detects an operation on the operation unit 40, by detecting an actuating signal arising from change in the electrical state of the key switch 40*c*. The resistor R1 and R2 are configured to allow an actuating signal to pass therethrough, the actuating signal arising from change in the electrical state of the key switch 40*c*.

As a result, the cellular telephone device 1 can suppress deterioration of the operability of the operation unit 40 related to the key switch 40*c*, while improving the efficiency of processing signals received by way of the key switch 40*c* as an antenna element.

Moreover, according to the present embodiment, the cellular telephone device 1 includes the filter F1 that is connected to the signal line L3 to cut off signals in a specific frequency band. In addition, the RF circuit unit 82 is configured to be able to process the first signal in a specific frequency band resonated by the first conductive region A1 formed between the power supply unit 83 and the filter F1, and the second signal resonated by the second conductive region A2 that is a region different from the first conductive region A1.

As a result, the cellular telephone device 1 can process signals in different usable frequency bands in the conductive region A1 and the conductive region A2, and thus is compatible with two usable frequency bands. It should be noted that, although the conductive region A2 is formed between the power supply unit 83 and the end portion of the signal line L1, it is not limited thereto. In other words, the conductive region A2 may be a region connected to the power supply unit 83, and may be a region formed with at least one of the key switch 40*c*, the signal lines L1, L2 and L3, and the antenna element 70.

Furthermore, according to the present embodiment, the cellular telephone device 1 includes the capacitor C1 that is connected to the signal line L1, L2 or L3 that configures a path of a signal processed by the RF circuit unit 82.

Here, when the operation key member 40*a* is depressed, a direct current related to an actuating signal flows through the signal line L1. When the direct current is input into the RF circuit unit 82 via the antenna element 70, the characteristic of the RF circuit unit 82 may vary due to the direct current. Moreover, there is a conceivable case in which the direct current is short-circuited with the ground (GND) potential in the main substrate 50. In the cellular telephone device 1 according to the present embodiment, the capacitor C1 is connected to the signal line L1, L2 or L3, and thus a direct current related to an actuating signal is cut off. As a result, the cellular telephone device 1 can suppress change in the characteristic of the RF circuit unit 82 due to a direct current related to an actuating signal.

In addition, according to the present embodiment, the power supply unit 83 is connected to the key switch 40*c* via the antenna element 70. Furthermore, the RF circuit unit 82 processes a signal resonated by the antenna element 70 and the key switch 40*c*.

As a result, the key switch 40*c* can be operated as a part of the antenna element 70. Therefore, in the cellular telephone device 1, downsizing of the antenna element can be realized by reducing the entire size of the antenna element.

Moreover, according to the present embodiment, the key switch 40*c* and the antenna element 70 are capacitively connected with each other. As a result, the cellular telephone device 1 can simplify the configuration for connecting the key switch 40*c* and the antenna element 70. Furthermore, in the cellular telephone device 1, the key switch 40*c* and the antenna element 70 are capacitively connected with each other, thereby reducing the influence due to a human body. Therefore, the cellular telephone device 1 can suppress deterioration of the operability of the operation unit 40 related to the key switch 40*c*.

In addition, according to the present embodiment, the key switch 40*c* and the tip 71 of the antenna element 70 are capacitively connected with each other, by capacitively coupling the conductive pattern 90 and the antenna element 70 with the insulating layers 91 interposed therebetween. As a result, the cellular telephone device 1 can simplify the configuration for connecting the key switch 40*c* and the antenna element 70.

Moreover, according to the present embodiment, the tip 71 of the antenna element 70 in an elastically deformed state abuts the insulating layer 91. As a result, the cellular telephone device 1 can securely capacitively couple the key switch 40*c* and the antenna element 70.

MODIFIED EXAMPLE

Figure 6:
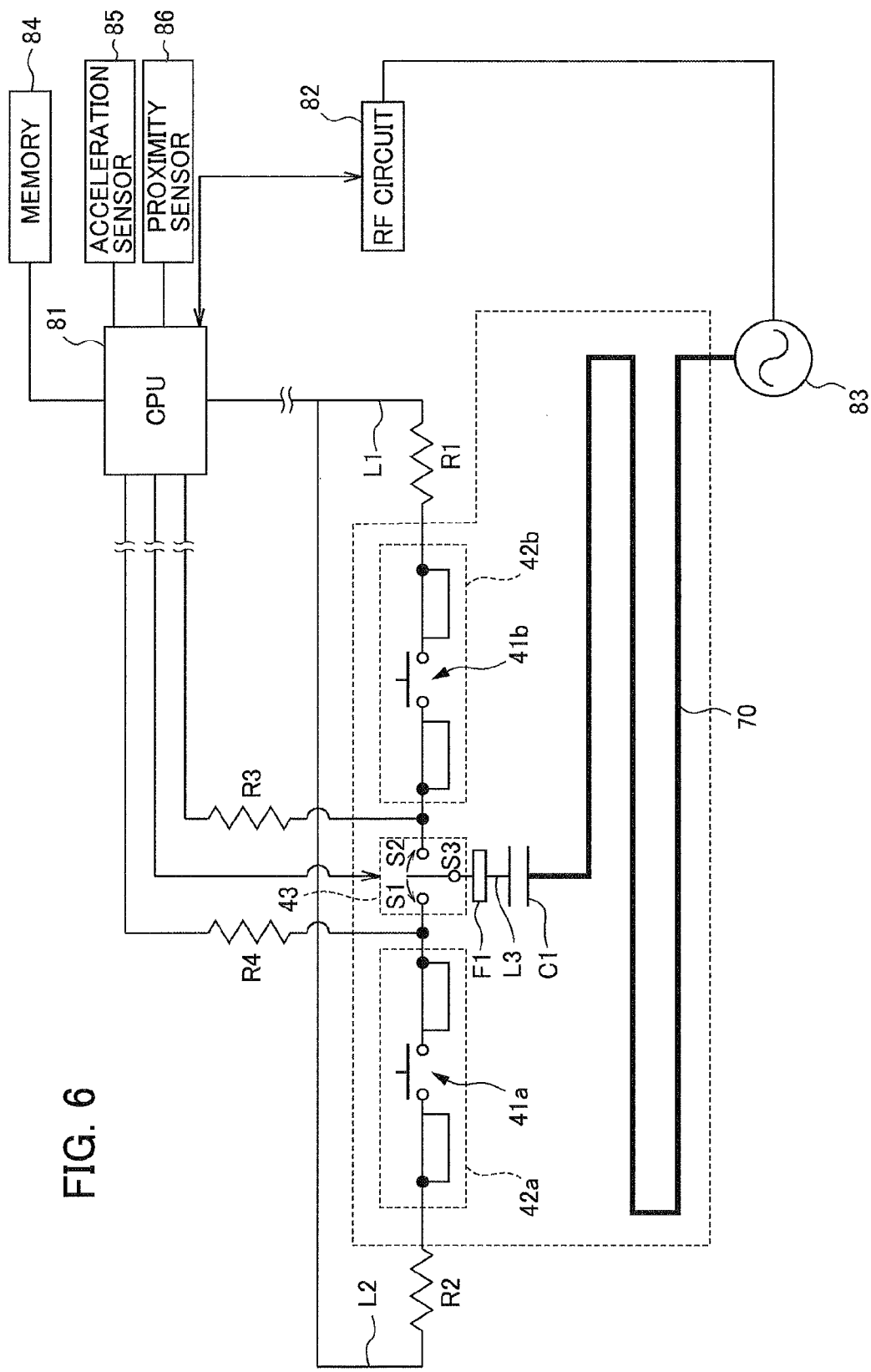
FIG. 6 is a diagram showing a modified example of an electrical configuration regarding the key switch and the antenna element.

The configuration of the cellular telephone device 1 according to the present embodiment is not limited to that shown in FIG. 4, and may employ a configuration as shown in FIG. 6. FIG. 6 is a diagram showing a modified example of an electrical configuration of key switches 42a and 42b and the antenna element 70.

As shown in FIG. 6, the cellular telephone device 1 includes: the key switches 42a and 42b as conductive portions; a switch 43 as a switching unit; the antenna element 70; the CPU 81 as an operation detecting unit; the RF circuit unit 82 as a signal processing unit; the power supply unit 83; memory 84 as a storage unit; an acceleration sensor 85 as an inclination angle detecting unit; a proximity sensor 86 as a proximity state detecting unit; the signal lines L1, L2 and L3 as conductive portions; resistors R1, R2, R3 and R4 as high-frequency cutoff units; the capacitor C1; and the filter F1. Moreover, in FIG. 6, configurations identical to the configurations shown in FIG. 4 are assigned with the same reference numerals, and descriptions thereof are omitted.

It should be noted that configurations of switch electrodes 41a and 41b and the key switches 42a and 42b shown in FIG. 6 are identical to the configurations of the switch electrode 40d and the key switch 40c shown in FIG. 4, respectively. In practice, the number of the key switches is not limited to two, but three or more key switches may exist; however, a case of including two key switches is described for convenience of explanation.

The switch 43 has a fixed contact S1 connected to the key switch 42a, a fixed contact S2 connected to the key switch 42b, and a movable contact S3 connected to the signal line L3. The switch 43 selectively connects the movable contact S3 to any one of the fixed contacts S1 and S2 according to control of the CPU 81.

The memory 84 stores relative position information of each of the key switches 42a and 42b in the key substrate 40b. The position information is, for example, a table indicating relative positional relationship of each of the key switches 42a and 42b.

The acceleration sensor 85 can detect, for example, acceleration in three axial directions. When the inclination of the cellular telephone device 1 changes, the acceleration sensor 85 detects the change as acceleration data. In addition, based on the detected acceleration data, the CPU 81 performs predetermined calculation to obtain an inclination angle for each of three axes. As a result, the CPU 81 recognizes a direction in which the cellular telephone device 1 is oriented.

The proximity sensor 86 is configured with, for example, a photo sensor, an infrared sensor, etc. The plurality of proximity sensors 86 are disposed in the vicinities of the operation key members 40a. By way of the proximity sensors 86, the CPU 81 recognizes which operation key member 40a is approached by a physical object (for example, a human body).

As shown in FIG. 6, the plurality of key switches 42a and 42b are provided to the operation key members 40a, correspondingly and respectively. In addition, each of the key switches 42a and 42b functions as an antenna. More specifically, in a case in which an operation key member 40a corresponding to one of the key switches 42a and 42b is operated, the CPU 81 connects another one of the key switches 42a and 42b to the power supply unit 83 by way of the switch 43. As a result, another one of the key switches 42a and 42b functions as an antenna.

In this way, the cellular telephone device 1 feeds electrical power to one of the key switches 42a and 42b that is not in operation. In other words, the cellular telephone device 1 does not feed electrical power to one of the key switches 42a and 42b that is in operation. Accordingly, the cellular telephone device 1 can reduce the influence on a human body (SAR: Specific Absorption Rate) due to signals resonated by any one of the key switches 42a and 42b.

Moreover, the CPU 81 may switch the switch 43 to one of the key switches 42a and 42b, of which signal intensity in received frequency is stronger. As a result, in the cellular telephone device 1, the key switches 42a and 42b can function as a diversity antenna.

In addition, although not illustrated in FIG. 6, three or more key switches 40c are formed as shown in FIG. 3. In a case in which the operation key member 40a corresponding to any one of the key switches 40c is operated, based on the position information stored in the memory 44, the CPU 81 connects one of the key switches 40c, which is disposed in a furthest position from the operated one of the key switches 40c, to the power supply unit 83 by way of the switch 43.

For example, in FIG. 3, the key switches 40c are disposed in a matrix on the key substrate 40b. In a case in which the operation key member 40a disposed in a lower left corner (key "3") is operated among the plurality of operation key members 40a in FIG. 1, the electrical state of the key switch 40c corresponding to the operated operation key member 40a changes. When the CPU 81 detects this change in the electrical state, the CPU 81 connects a key switch 40c, which corresponds to an operation key member 40a disposed in an upper right corner (key "2") in FIG. 1, to the power supply unit 83 by way of the switch 43. As a result, the key switch 40c disposed in the upper right corner functions as an antenna. Therefore, the cellular telephone device 1 can appropriately reduce the influence on a human body due to signals resonated by the key switches 40c.

Furthermore, in a case in which the operation key member 40a corresponding to the key switch 40c is operated, based on an inclination angle of the body 2 detected by the acceleration sensor 85, the CPU 81 connects the key switches 40c other than the key switch 40c corresponding to the operated operation key member 40a to the power supply unit 83 by way of the switch 43.

For example, the CPU 81 detects a vertically upward direction by way of the acceleration sensor 85. The CPU 81 connects the key switches 40c disposed in the vertically upward direction in the body 2 other than an operated key switch 40c to the power supply unit 83 by way of the switch 43. As a result, the key switches 40c disposed in the vertically upward direction in the body 2 other than the operated key switch 40c function as an antenna. Therefore, the cellular telephone device 1 can appropriately reduce the influence on a human body due to signals resonated by the key switches 40c. It should be noted that the key switches 40c disposed in the vertically upward direction in the body 2 include not only the key switches disposed in the front face 2a of the body 2, but also the key switches (not shown) disposed in a side face and a rear face of the body 2.

Alternatively, based on a proximity state of a physical object (for example, a human body) (whether the physical object is proximate) detected by way of the proximity sensors 86 disposed in the vicinities of the operation key members 40a, the CPU 81 connects the key switches 40c other than the key switch 40c corresponding to the operation key member 40a proximate to the physical object to the power supply unit 83 by way of the switch 43. As a result, the key switches 40c other than the key switch 40c proximate to the physical object function as an antenna. Therefore, the cellular telephone device 1 can appropriately reduce the influence on a human body due to signals resonated by the key switches 40c.

Although the embodiment of the present invention has been described above, the present invention is not limited to the aforementioned embodiment, and can be altered as appropriate. For example, as a modified example of the aforementioned embodiment, by adjusting the positions of disposing the resistors R1 and R2, the key switches 40c alone or any one of the key switches 40c and the signal lines L1 and L2 may be used as a conductive portion.

For example, in the signal lines L1 and L2, by disposing the resistors R1 and R2 immediately adjacent to the switch electrode 40d, the key switches 40c alone can be used as conductive portions. Moreover, in the signal lines L1 and L2, by disposing the resistors R1 and R2 in positions distant from the switch electrode 40d, the key switches 40c and the signal lines L1 and L2 can be used as conductive portions.

It should be noted that the resistors R1 and R2, the capacitor C1 and the antenna element 70 are not essential constituent elements in the mobile terminal device of the present invention, and the mobile terminal device of the present invention is implemented by including: the key switch 40c provided to the body 2, in which an electrical state of the key switch 40c changes depending on an operation on the operation unit 40; the CPU 81 that detects an operation on the operation unit 40 based on change in the electrical state of the key switch 40c; the power supply unit 83 that is electrically connected to the key switch 40c; and the RF circuit unit 82 that is connected to the power supply unit 83, and processes a signal resonated by the key switch 40c.

It should be noted that, although the cellular telephone device 1 is described as a mobile terminal device in the aforementioned embodiment, the present invention is not limited thereto, and the mobile terminal device may be a PHS (Personal Handyphone System), a PDA (Personal Digital Assistant), a portable navigation device, a personal computer, a notebook PC, a mobile gaming device or the like.

What is claimed is:

1. A mobile terminal device, comprising:
   a body;
   operation portions provided to the body;
   a conductive portion provided to the body, an electrical state of the conductive portion changing in response to an operation on the operation portions;
   an operation detecting unit that is connected to the conductive portion, and detects an operation on the operation portions based on change in the electrical state of the conductive portion;
   an antenna element connected to the conductive portion;
   a power supply unit connected to the conductive portion via the antenna element;
   a signal processing unit that is connected to the power supply unit and processes a signal resonated by the conductive portion; and
   a circuit board,
   wherein the conductive portion comprises a signal line that electrically connects the operation portions and the operation detecting unit,
   wherein the signal line transfers a signal indicating an operation is performed to the operation portions,
   wherein the signal line is connected to the power supply unit and operates as an antenna element,
   wherein the signal processing unit processes a signal resonated by the antenna element and the conductive portion,
   wherein an insulating layer is formed on a surface layer of the circuit board, and the conductive portion is formed as a conductive pattern on a layer that is inner than the insulating layer,
   wherein the conductive portion and the antenna element are capacitively connected with each other, by capacitively coupling the conductive pattern and the antenna element with the insulating layer interposed therebetween,
   wherein the antenna element includes an elastic deformation portion being elastically deformable, and
   wherein the elastic deformation portion abuts the insulating layer.

2. The mobile terminal device according to claim 1, further comprising a high-frequency cutoff unit that is connected to the conductive portion and cuts off a high frequency signal,
   wherein a path-length from an end portion in the conductive portion connected to the high-frequency cutoff unit to an end portion connected to the power supply unit is a length of n/4 times (n =1, 2, 3, . . .) a wavelength of a signal processed by the signal processing unit.

3. The mobile terminal device according to claim 2,
   wherein the operation detecting unit detects an operation on the operation portions by detecting an actuating signal arising from change in the electrical state of the conductive portion, and
   wherein the high-frequency cutoff unit is configured to allow the actuating signal to pass therethrough.

4. The mobile terminal device according to claim 3, wherein the high-frequency cutoff unit is a resistor provided between the conductive portion and the operation detecting unit.

5. The mobile terminal device according to claim 3, wherein the high-frequency cutoff unit is an inductor provided between the conductive portion and the operation detecting unit.

6. The mobile terminal device according to claim 1, further comprising a filter that is connected to the conductive portion, and cuts off a signal in a specific frequency band,
   wherein the signal processing unit is configured to be able to process a signal in the specific frequency band resonated by a first conductive region formed between the power supply unit and the filter, and a signal resonated by a second conductive region that is a region different from the first conductive region in the conductive portion.

7. The mobile terminal device according to claim 1, further comprising a capacitor connected to a path of a signal processed by the signal processing unit.

8. A mobile terminal device, comprising:
   a body;
   operation portions provided to the body;
   a conductive portion provided to the body, an electrical state of the conductive portion changing in response to an operation on the operation portions;
   an operation detecting unit that is connected to the conductive portion, and detects an operation on the operation portions based on change in the electrical state of the conductive portion;
   a power supply unit connected to the conductive portion;
   a signal processing unit that is connected to the power supply unit and processes a signal resonated by the conductive portion;
   a switching unit that switches connection of each of the conductive portions and the power supply unit;
   a circuit board on which the plurality of conductive portions are disposed; and
   a proximity state detecting unit that detects a proximity state of a physical object relative to each of the operation portions,
   wherein the conductive portion comprises a signal line that electrically connects the operation portions and the operation detecting unit, wherein the signal line transfers a signal indicating an operation is performed to the operation portions, wherein the signal line is connected to the power supply unit and operates as an antenna element, wherein a plurality of the operation portions are provided, wherein a plurality of the conductive portions are provided correspondingly to the plurality of operation portions, wherein each of the plurality of conductive portions functions as an antenna, and wherein, when one operation portion among the plurality of operation portions is operated, the switching unit selectively connects the conductive portions other than a conductive portion corresponding to the one operation portion thus operated to the power supply unit based on the proximity state.

9. The mobile terminal device according to claim 8, further comprising:

a storage unit that stores relative position information of the conductive portions in the circuit board, wherein, when one operation portion among the plurality of operation portions is operated, the switching unit selectively connects the conductive portions other than a conductive portion corresponding to the one operation portion thus operated to the power supply unit based on the position information.

10. The mobile terminal device according to claim 8, further comprising:

an inclination angle detecting unit that detects an inclination angle of the body, wherein, when one operation portion among the plurality of operation portions is operated, the switching unit selectively connects the conductive portions other than a conductive portion corresponding to the one operation portion thus operated to the power supply unit based on the inclination angle of the body.

* * * * *